United States Patent
Bankhead et al.

(10) Patent No.: US 7,082,367 B2
(45) Date of Patent: Jul. 25, 2006

(54) SEISMIC DATA CALIBRATION USING CROSSPLOTTED AVO ATTRIBUTES

(75) Inventors: Bradley L. Bankhead, Houston, TX (US); Arcangelo G. Sena, Houston, TX (US)

(73) Assignee: Veritas DGC Inc., Houston, TX (US)

( * ) Notice: Subject to any disclaimer, the term of this patent is extended or adjusted under 35 U.S.C. 154(b) by 50 days.

(21) Appl. No.: 10/884,579

(22) Filed: Jul. 2, 2004

(65) Prior Publication Data

US 2006/0004521 A1   Jan. 5, 2006

(51) Int. Cl.
*G01V 1/28* (2006.01)
*G01V 1/00* (2006.01)
(52) U.S. Cl. ................................ 702/14; 367/73
(58) Field of Classification Search .................. 702/14; 367/37, 38, 40, 47, 52, 56, 73; 703/2
See application file for complete search history.

(56) References Cited

U.S. PATENT DOCUMENTS

| | | | | |
|---|---|---|---|---|
| 5,691,958 A | * | 11/1997 | Calvert et al. ................ | 367/73 |
| 5,784,334 A | * | 7/1998 | Sena et al. .................... | 367/47 |
| 6,026,059 A | * | 2/2000 | Starr ............................ | 367/72 |
| 6,061,298 A | * | 5/2000 | Madtson et al. .............. | 367/21 |
| 6,654,692 B1 | * | 11/2003 | Neff ............................. | 702/11 |
| 6,950,786 B1 | * | 9/2005 | Sonneland et al. ............ | 703/2 |
| 6,954,403 B1 | * | 10/2005 | Neff et al. .................... | 367/48 |
| 6,970,397 B1 | * | 11/2005 | Castagna et al. ............. | 367/73 |
| 2004/0240321 A1 | * | 12/2004 | Canning ....................... | 367/47 |

OTHER PUBLICATIONS

Li et al., AVO Modeling in Seismic Processing and Interpretation Part III. Applications, Feb. 2004, CSEG Recorder, pp. 42-48.*
Hampson et al., Uncertainty in AVO- How Can We Measure It?, Mar. 2004, CSEG Recorder, pp. 6-12.*
Smith, G.C. and Gidlow, P.M., "*Weighted Stacking for Rock Property Estimation and Detection of Gas*", Geophysical Prospecting 35, 1987, pp. 993-1014.

* cited by examiner

*Primary Examiner*—John Barlow
*Assistant Examiner*—Toan M. Le
(74) *Attorney, Agent, or Firm*—Conley Rose, P.C.

(57) ABSTRACT

Disclosed herein are systems and methods for calibrating seismic data using seismic attribute pairs such as amplitude versus offset (AVO) attributes. In one embodiment, a method includes: receiving traces from a seismic survey that covers a volume; determining a pair of seismic attributes for each of a plurality of positions within the volume ("survey pairs"); deriving pairs of seismic attributes from a source independent of the survey ("independent pairs"); calculating a rotation angle and one or more scale factors that calibrate the survey pairs relative to the independent pairs; and calibrating the traces with the rotation angle and the one or more scale factors. Thus, for example, the overall amplitude and relative AVO of pre-stack seismic gathers can be calibrated to match that of synthetic gathers by matching crossplots of AVO attributes generated from each dataset.

33 Claims, 9 Drawing Sheets

SEISMIC DATA CALIBRATION USING CROSSPLOTTED AVO ATTRIBUTES

BACKGROUND

Seismic surveys, when used in conjunction with other available geophysical, borehole, and geological data, provide information about the structure and distribution of subsurface rock types and their interstitial fluids. Oil companies rely on interpretation of such seismic data for selecting the sites in which to invest in drilling exploratory oil wells. Even though seismic surveys provide maps of geological structures rather than direct measurements of petroleum, seismic surveys have become a vital part of selecting the site of an exploratory and development well. Experience has shown that using seismic surveys greatly improves the likelihood of a successful venture.

When borehole logs are available from nearby wells, seismic survey data can be enhanced by combining it with the log data. Various methods exist for combining the different data types, but at least some of the methods involve the use of a synthetic survey.

To obtain a synthetic survey, analysts first employ the borehole logs to make determinations of density, porosity, fluid type, shear wave velocity and pressure wave velocity in each of the formation layers. The analysts then construct a mathematical model of the formation and simulate its response to a seismic survey. Just as in a real survey, in the simulation a seismic wave propagates through the model and reflects where the acoustic impedance changes. Energy from the reflected waves travels to receiver positions where the energy is recorded in the form of a seismic trace.

The traces from a synthetic survey perfectly scaled and representative of reflection signal strengths. However, real world seismic surveys require the use of physical transducers, which introduce scaling errors. Scaling errors cause inaccuracies in seismic attributes calculated from seismic surveys. Synthetic surveys provide a means for identifying and correcting at least some of these scaling errors.

At least some existing methods provide for normalization of seismic traces relative to synthetic traces, but to date these methods fail to adequately account for the dependence of scaling error on incidence angle. Such a dependence is common, and a method that provides for compensation of such an error dependence would be expected to significantly improve the accuracy of seismic attribute calculations, thereby further enhancing the likelihood of success in discovering and exploiting hydrocarbons, ores, water, and geothermal reservoirs.

SUMMARY

Accordingly, disclosed herein are systems and methods for calibrating seismic data using seismic attribute pairs such as amplitude versus offset (AVO) attributes. In one embodiment, a method comprises: receiving traces from a seismic survey that covers a volume; determining a pair of seismic attributes for each of a plurality of positions within the volume ("survey pairs"); deriving pairs of seismic attributes from a source independent of the survey ("independent pairs"); calculating a rotation angle and one or more scale factors that calibrate the survey pairs relative to the independent pairs; and calibrating the traces with the rotation angle and the one or more scale factors. Thus, for example, the overall amplitude and relative AVO of pre-stack seismic gathers can be calibrated to match that of synthetic gathers by matching crossplots of AVO attributes generated from each dataset. Calibration in crossplot space may be an automatic process or an interactive process in which the user scales and rotates a cluster of points from the seismic data until it overlays the same cluster from the synthetic data. The scalars used to modify the attributes in crossplot space can then be used to scale the original seismic gathers. The resulting gathers should have an amplitude range similar to the synthetic data and an offset amplitude trend consistent with the model data.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
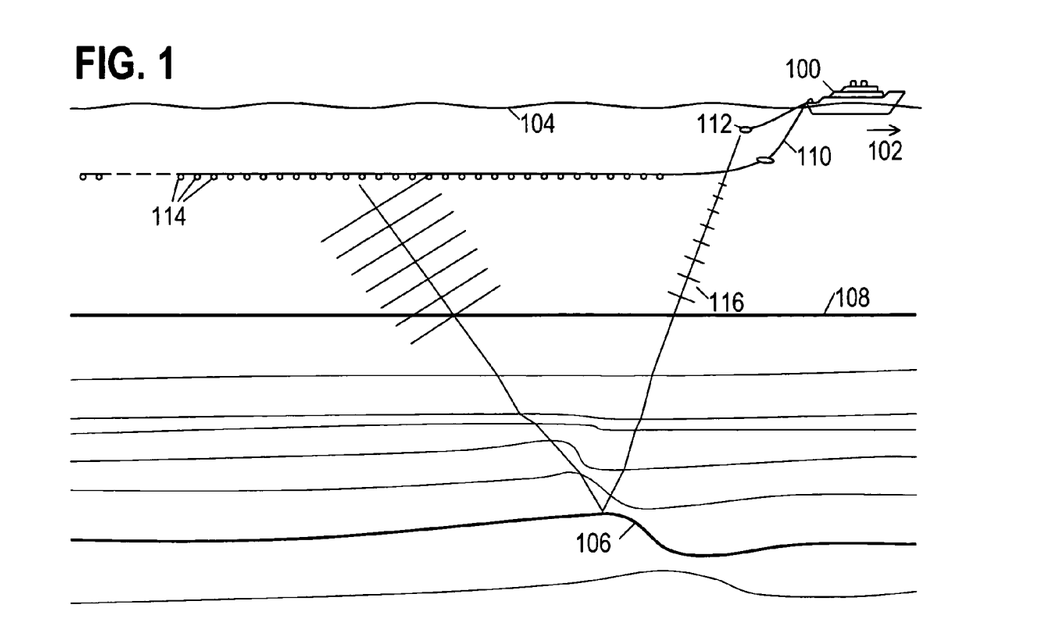
FIG. 1 shows an illustrative seismic survey operation.

Seismic data acquisition is routinely performed both on land and at sea. At sea, seismic ships deploy one or more cables ("streamers") behind the ship as the ship moves forward. Each streamer includes multiple receivers in a configuration generally as shown in FIG. 1. Streamer 110 trails behind ship 100, which moves in the direction of the arrow 102. As shown in FIG. 1, source 112 is also towed behind ship 100. Source 112 and receivers 114 typically deploy below the surface of the ocean 104. Streamer 110 also includes electrical or fiber-optic cabling for interconnecting receivers 114 and seismic equipment on ship 100. The streamers may be several miles long and often a seismic ship trails multiple streamers to increase the amount of seismic data collected. Data is digitized near the receivers 114 and is transmitted to the ship 100 through the cabling at rates of 7 (or more) million bits of data per second. Processing equipment aboard the ship controls the operation of source 112 and receivers 114, and processes the acquired data.

Source 112 emits seismic waves 116 which propagate downward through subsurface structures and reflect from boundaries (such as, e.g., formation boundary 106). The reflected waves are sensed by receivers 114 and recorded as a function of time from the triggering of source 112. By determining the time it takes for seismic waves 116 to propagate from source 112 to (say) boundary 106 and back to receivers 112, the position and topography of boundary 106 can be determined.

The receivers used in marine seismology are commonly referred to as hydrophones, or marine pressure phones, and are usually constructed using a piezoelectric transducer. Synthetic piezoelectric materials, such as barium zirconate, barium titanate, or lead mataniobate, are generally used. A sheet of piezoelectric material develops a voltage difference between opposite faces when subjected to mechanical bending. Thin electroplating on these surfaces allows an electrical connection to be made to the device so that this voltage can be measured. The voltage is proportional to the amount of mechanical bending, which in turn is proportional to the pressure changes caused by seismic energy propagating through the water. The physical nature of the receivers causes the receivers to introduce scaling errors in their measurement of seismic energy.

Figure 2:
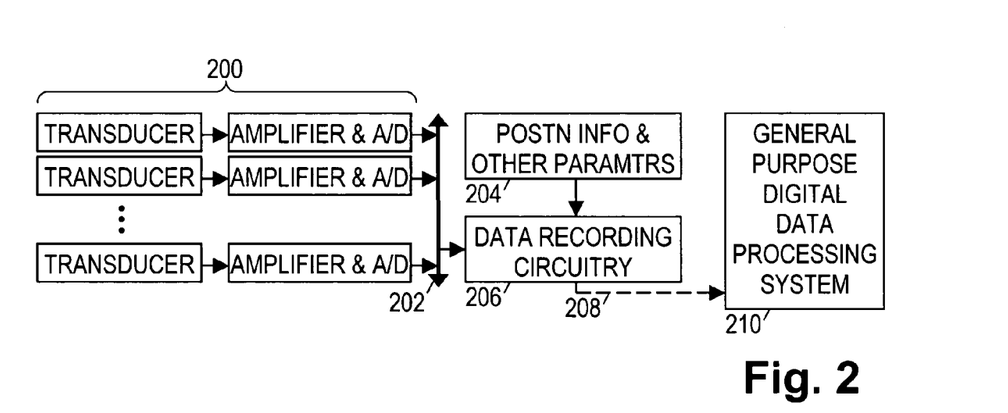
FIG. 2 shows a block diagram of an illustrative seismic survey data gathering system.

FIG. 2 shows a block diagram of seismic survey system electronics. The block diagram of FIG. 2 is representative of electronics that may be used in land surveys as well as in marine surveys. The detectors 200 include transducers to convert the seismic wave energy into electric signals, and may further include electronics to filter, amplify, and convert the electric signals into digital data. The digital data may be communicated to the recording unit 206 via a bus 202, or alternatively may be communicated via a dedicated information pathway or via a wireless connection. The recording unit 206 stores the digital data on an information storage medium, along with timing and position information for each of the detectors and any other parameters that may be useful in interpreting the stored data. The location information and other parameters may be provided via an independent interface 204 such as a user interface that allows manual entry of such information.

Recording unit 206 may use any suitable information storage medium. Due to the large volume of information to be stored, the information storage medium is generally some form of magnetic medium, e.g., disk drives or magnetic tape. However it is expected that the necessary storage capacity may also be provided by optical media or integrated circuit memories, though the associated cost may be somewhat higher. In an alternative embodiment, recording unit 206 simply gathers the data from the detectors and transmits the data in real time to a remote location such as a central storage facility.

The data collected by recording unit 206 may be communicated to a general purpose digital data processing system 210. System 210 may be responsible for performing each of the method operations after the relevant data has been acquired. Alternatively, the role of system 210 may be limited to preliminary processing of the seismic data, and some other computing entity may perform the disclosed method operations.

The communication of seismic data to system 210 may take place in any of various ways 208, including transmission via a wired or wireless communications link, and by physical transport of an information storage medium. System 210 may process the traces to combine information from multiple firings and to apply corrections to the traces for such effects as wave propagation delays. Resampling of the data may be performed to obtain evenly-spaced, time- or depth-synchronized samples on each of the traces, and to obtain estimated traces at interpolated positions within the detector array. The trace data may also be converted into any number of seismic attribute measurements including without limitation phase, peak amplitude, sound velocity, acoustic impedance, rock porosity, water saturation, and hydrocarbon content.

To aid in the interpretation of trace data, additional data may be gathered from existing wells. The additional data may take various forms, including core samples and digital logs of measurements made by downhole tools. From this data, acoustic properties are determined and a formation model is constructed at one or more specific points within the survey area. The formation model includes some combination of acoustic properties from which reflection coefficients can be determined. System 210 (or some other computing system that implements an embodiment of the disclosed method) is provided with the formation model, or alternatively provided with synthetic seismograms generated from the formation model.

Figure 3:
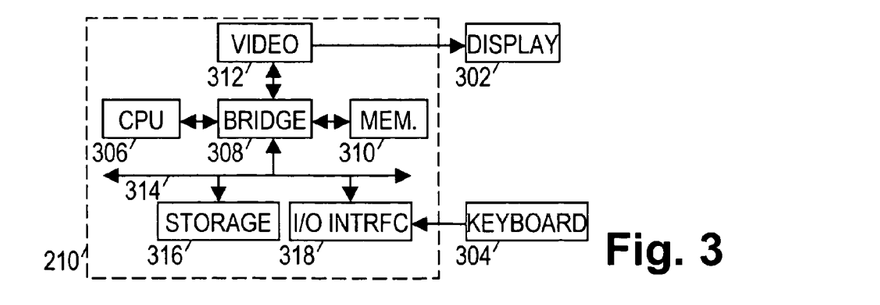
FIG. 3 shows a block diagram of an illustrative seismic survey data processing system.

FIG. 3 shows a block diagram of an illustrative digital data processing system 210. To interact with a user, system 210 may be coupled to a text or graphical display 302, and to an input device 304. Display 302 and input device 304 may together operate as an interface between the user and system 210. That is, system 210 may perform certain actions prompted by user actuation of input device 304 and provide the user with a response via display 302.

System 210 may include a central processing unit (CPU) 306 that is coupled by a bridge 308 to a system memory 310. CPU 306 may also be coupled by bridge 308 to a video card 312 that in turn couples to display 302. CPU 306 may be further coupled by bridge 308 to an expansion bus 314. Also coupled to the expansion bus 314 may be a storage device 316 and an input/output interface 318. Input device 304 may be coupled to system 206 via input/output interface 318. CPU 306 may operate in accordance with software stored in memory 310 and/or storage device 316. Under the direction of the software, the CPU 306 may accept commands from an operator via a keyboard or some alternative input device 304, and may display desired information to the operator via display 302 or some alternative output device. CPU 306 may control the operations of other system components to retrieve, transfer, process, and store data.

Bridge 308 coordinates the flow of data between components. Bridge 308 may provide dedicated, high-bandwidth, point-to-point buses for CPU 306, memory 310, and video card 312. In systems having alternative architectures, the bridge 308 may be omitted and the communications between the CPU 306 and all the other system components may occur via bus 314.

Memory 310 may store software and data for rapid access. On the other hand, storage device 316 may store software and data for long-term preservation. Storage device 316 may be portable, may accept removable media, may be an installed component, or may be a integrated component on a main system circuit board. Storage device 316 may also be a removable memory device such as a memory card. In addition, alternatives for storage device 316 may include a nonvolatile integrated memory, a magnetic media storage device, an optical media storage device, or some other form of long-term information storage.

Video card 312 may provide customized processing for graphics, along with data conversion from a memory-based format to a signal format suitable for display 302. Display 302 may provide data in a visual format for use by an operator. For example, display 302 may display, inter alia, seismograms and crossplots such as those described with reference to FIGS. 6–11. Alternatively, display 302 may show a two or three dimensional volumes of various seismic attributes. The three-dimensional volumes may be displayed by providing a perspective view and/or by animating a two-dimensional image to illustrate data variation as a function of position.

Expansion bus 314 may support communications between bridge 308 and multiple other computer components. Bus 314 may couple to removable modular components and/or components integrated onto a circuit board with bridge 308 (e.g., audio cards, network interfaces, data acquisition modules, modems). In systems that include a network interface, the CPU 306 may access software and data via a network, thereby making it possible for system 210 to use information storage and processing resources external to system 210.

Input/output interface 318 may support communications with legacy components and devices not requiring a high-bandwidth connection. Interface 318 is coupled to input device 304, which may provide data to interface 318 in response to operator actuation. Input device 304 may be a keyboard or some other input device (e.g., pointing devices, buttons, sensors). Multiple input devices may be concurrently coupled to input/output interface 318 to provide data in response to operator actuation. Output devices (e.g., parallel ports, serial ports, printers, speakers, lights) may also be coupled to input/output interface 318 to communicate information to the operator.

In the current context, system 210 may be configured with software that processes seismic data to generate maps of seismic attributes. The software may be stored in storage device 316, and some or all of the software may be copied into memory 310 as needed for use by CPU 306. CPU 306 may retrieve the software instructions a few at a time from memory 310, and follow the procedures laid out by the software instructions to generate the desired maps. These procedures may include opportunities for interaction with a user of system 210, such as displaying fields that allow a user to identify the seismic data file to be operated on, or displaying controls that allow a user to alter processing parameters and change display characteristics.

Figure 4:
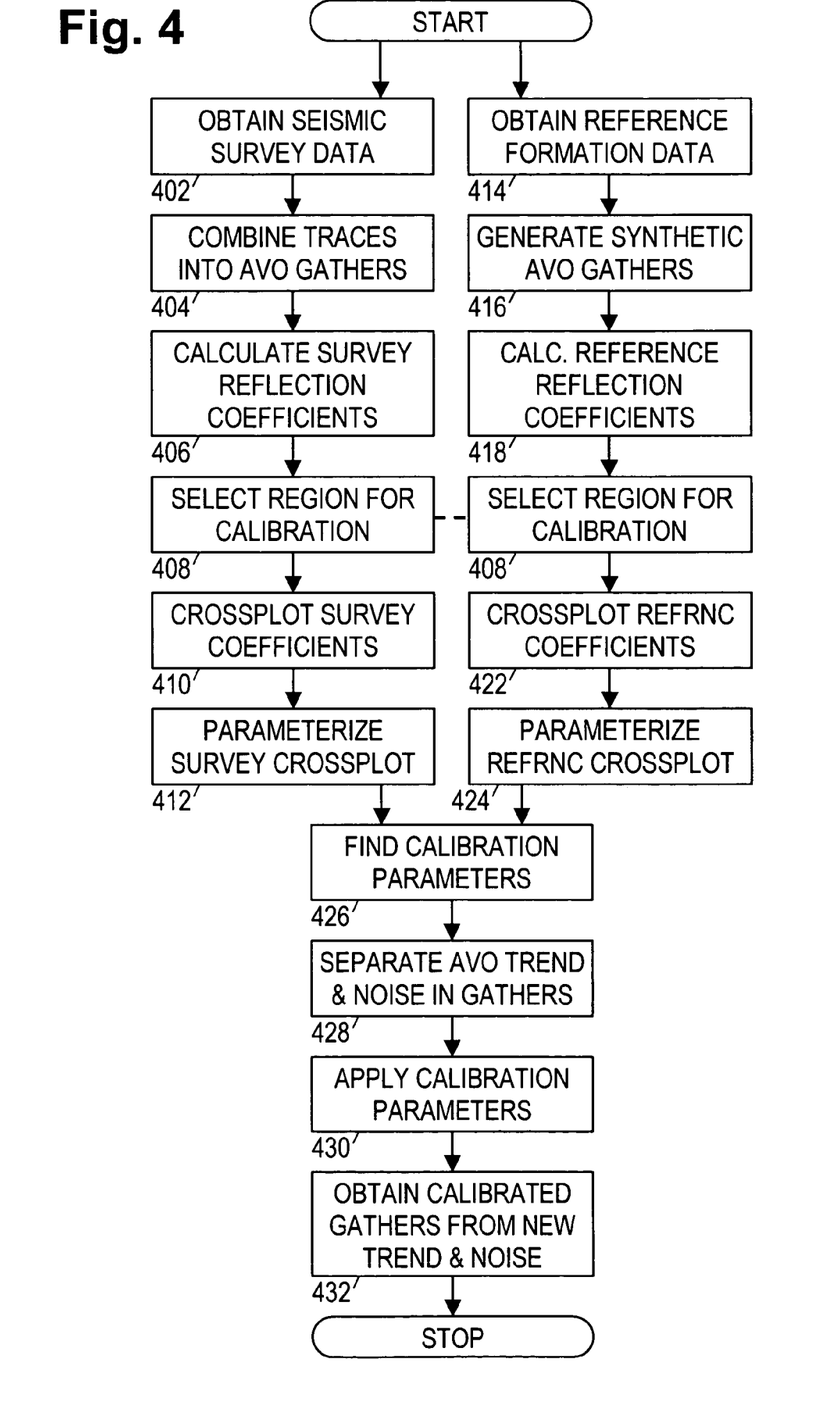
FIG. 4 shows a flowchart of an illustrative crossplot calibration method.

FIG. 4 illustrates an embodiment of a crossplot calibration method that may be implemented by system 210 to correct for scaling errors in seismic survey data. Though the contemplated implementation of the crossplot calibration method involves software, other implementations are possible. For example, the crossplot calibration method may be implemented in firmware or hardware. Users may employ programmable logic devices (PLDs) or application specific integrated circuits (ASICs) in contexts where speed is a priority. Although FIG. 4 shows operations in a particular order, the actual implementation may re-order some of the operations, may overlap the execution of sequential steps, and/or may execute different operations in parallel. As an example, the operations for blocks 402–412 may be conducted independently of, and thus in parallel with, the operations for blocks 414–424. Some implementations may employ multiple processing units that execute operations of a single block in parallel.

Figure 5:
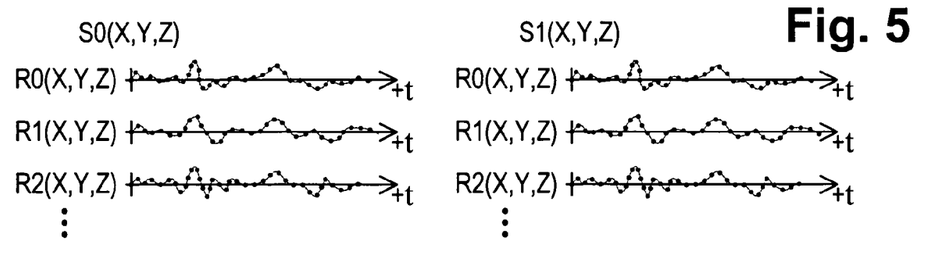
FIG. 5 shows illustrative traces and their digitization.

In block 402, system 210 obtains (digital) seismic survey data. The survey data is obtained in the form of digitized seismic traces, each trace having an associated receiver position and seismic source position. FIG. 5 shows an illustrative collection of survey traces. The seismic source is originally fired at position S0, causing receivers at locations R0–R2 to receive seismic reflections from formation boundaries. The received signals are sampled and digitized as indicated by the dots on each of the traces. The seismic source is then fired at position S1, producing another set of seismic traces at each of the receivers. Typically, although not necessarily, the traces of the seismic survey are subjected to some preliminary processing to maximize their signal to noise ratio before being provided to system 210. If not, the preliminary processing may be performed at this stage.

In block 404 (FIG. 4), system 210 combines seismic traces to form amplitude versus offset (AVO) gathers. This operation begins with the determination of midpoints between the receiver and source positions for each trace. Those traces that share a common midpoint (to within some predetermined tolerance) are combined to form a gather, and in this manner a gather is formed for each midpoint. The set of traces for a given midpoint may be ordered in terms of offset (defined as the distance from the receiver to the midpoint, or alternatively, defined as the angle between rays drawn from the reflector to the receiver and midpoint). Traces sharing a common offset and midpoint are "stacked", i.e., averaged together. The final step of forming an AVO gather involves time compression or expansion of traces as a function of offset to compensate for differences in travel time through the formation, often termed "normal moveout" or NMO. After the operations of block 404, the seismic data has been organized into an AVO gather for each midpoint, with the traces in each gather showing the dependence of amplitude on offset.

Figure 6:
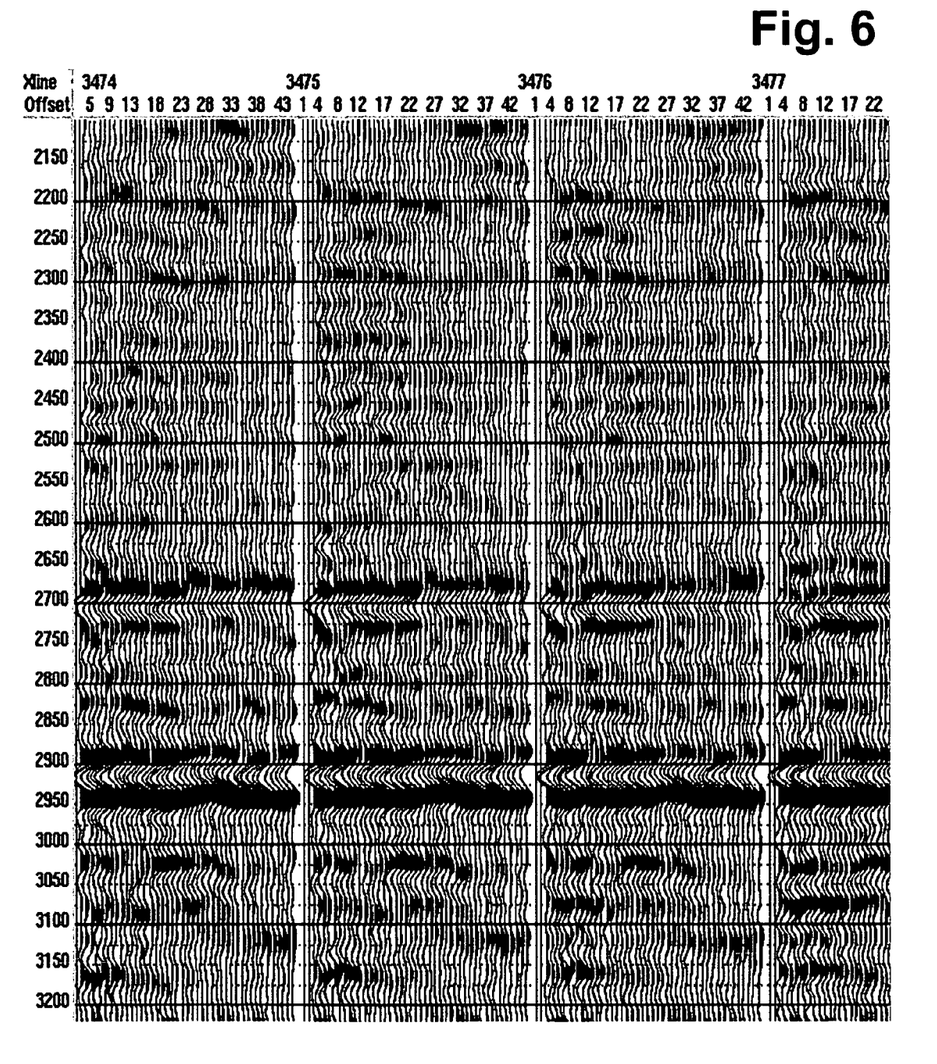
FIG. 6 shows an illustrative set of amplitude versus offset (AVO) gathers in wiggle-chart form.

FIG. 6 shows illustrative AVO gathers in the form of "wiggle traces". The midpoints are numbered sequentially (gathers shown for midpoints 3474–3477), with a 45-trace gather shown for each midpoint. The vertical scale corresponds to recording time in milliseconds. Finally, the negative portions of the wiggle traces are "filled in" to aid in visual interpretation.

In block 406 (FIG. 4), system 210 processes the AVO gathers to determine reflection coefficients or other seismic attributes as a function of position, time/depth, and offset. In one embodiment, the system 210 determines reflection coefficients for shear waves and pressure waves, denoted as Rs and Rp, respectively. One method for determining reflection coefficients from AVO gathers is disclosed in P. M. Gidlow, G. C. Smith, and P. J. Vail, "Hydrocarbon Detection Using Fluid Factor Traces: A case history", Expanded Abstracts of the Joint SEG/EAEG Summer 1992 Research Workshop on "How Useful Is Amplitude-Versus-Offset (AVO) Analysis?", pp. 78–89. Other methods are known and may be used.

Figure 7:
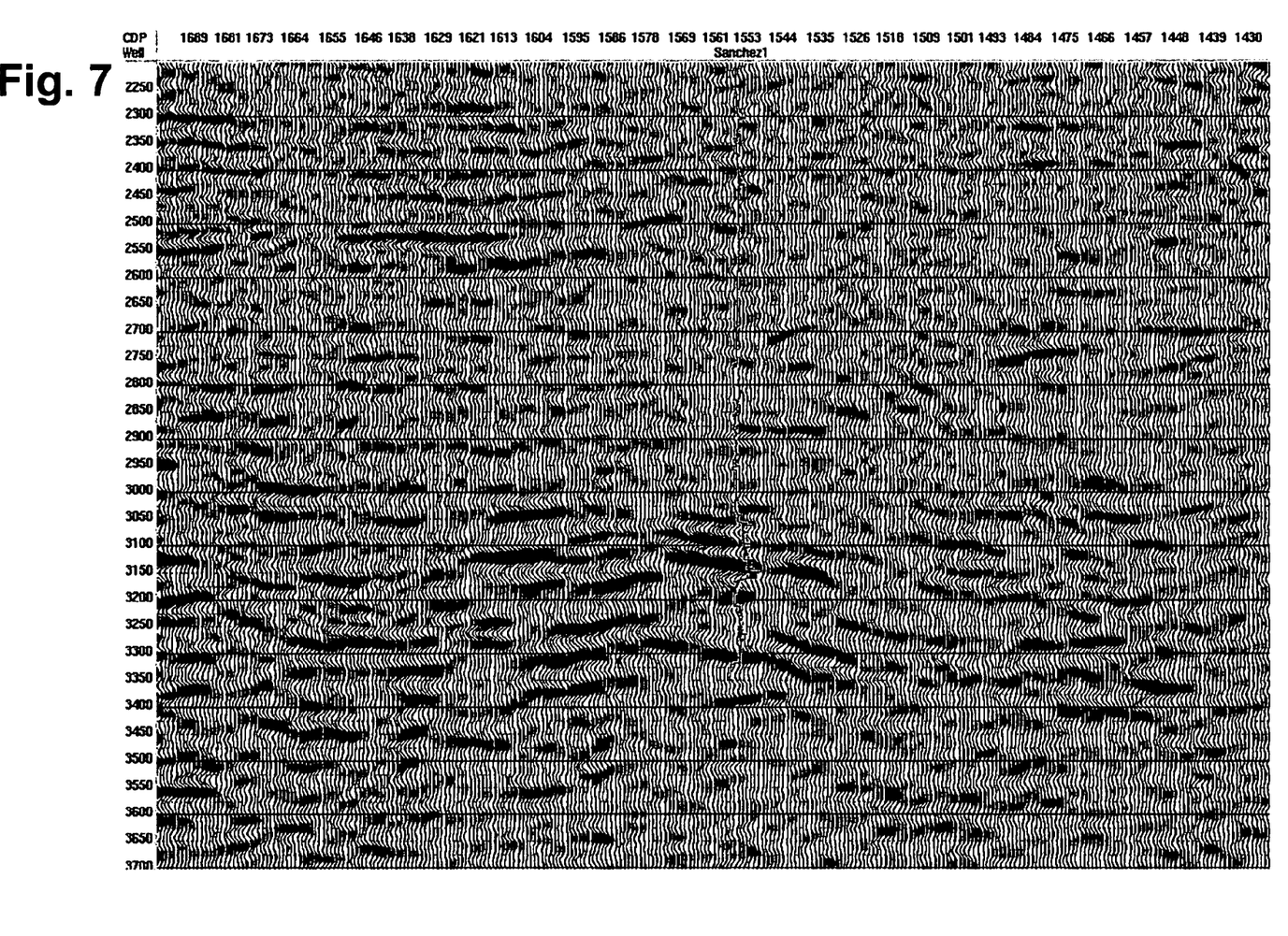
FIG. 7 shows an illustrative map of pressure wave reflectivity in wiggle-chart form.
Figure 8:
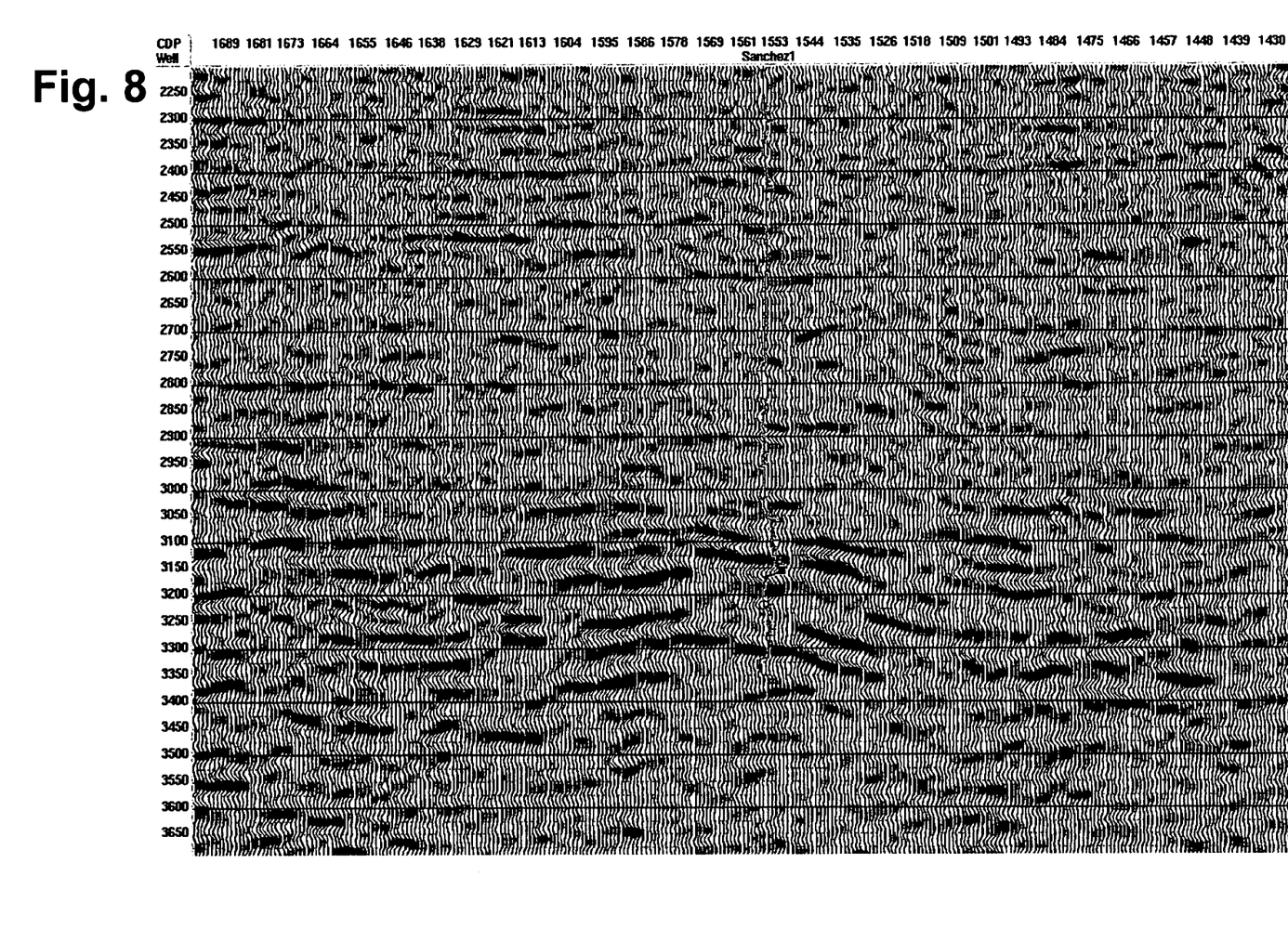
FIG. 8 shows an illustrative map of shear wave reflectivity in wiggle-chart form.

FIG. 7 shows illustrative Rp data in the form of wiggle traces. FIG. 8 shows illustrative Rs data for the same region. In both views, the horizontal axis corresponds to horizontal displacement, and the vertical axis corresponds to recording time. Although Rp and Rs data are employed for this example, other seismic attribute pairs may alternatively be used.

In block 408 (FIG. 4), system 210 isolates a region of the reflection coefficient (or other seismic attribute) data to serve as a basis for the calibration. This region may be selected by a user, or some algorithmic selection technique may be employed. The region is selected subject to two constraints. The first constraint is the availability of synthetic seismic survey data for the region. The second constraint is that the region contain primarily formation data that satisfies (within some tolerance) a linear relationship. For example, the user may select a region containing primarily wet sand/shale reflectors, which are known to have an approximately linear relationship between their reflection coefficients.

In an alternative embodiment, the whole set of seismic attribute data is used as a basis for the calibration, with certain regions excluded. These regions typically represent possible pay zones, and they exhibit attribute relationships that deviate significantly from the background. For example, system 210 may be configured to use a ratio of shear wave reflectivity to pressure wave reflectivity as an indicator of hydrocarbon concentrations. Throughout the bulk of the data, this ratio will be substantially constant. Regions having ratios outside a predetermined tolerance may represent possible pay zones, and may be excluded.

Figure 9:
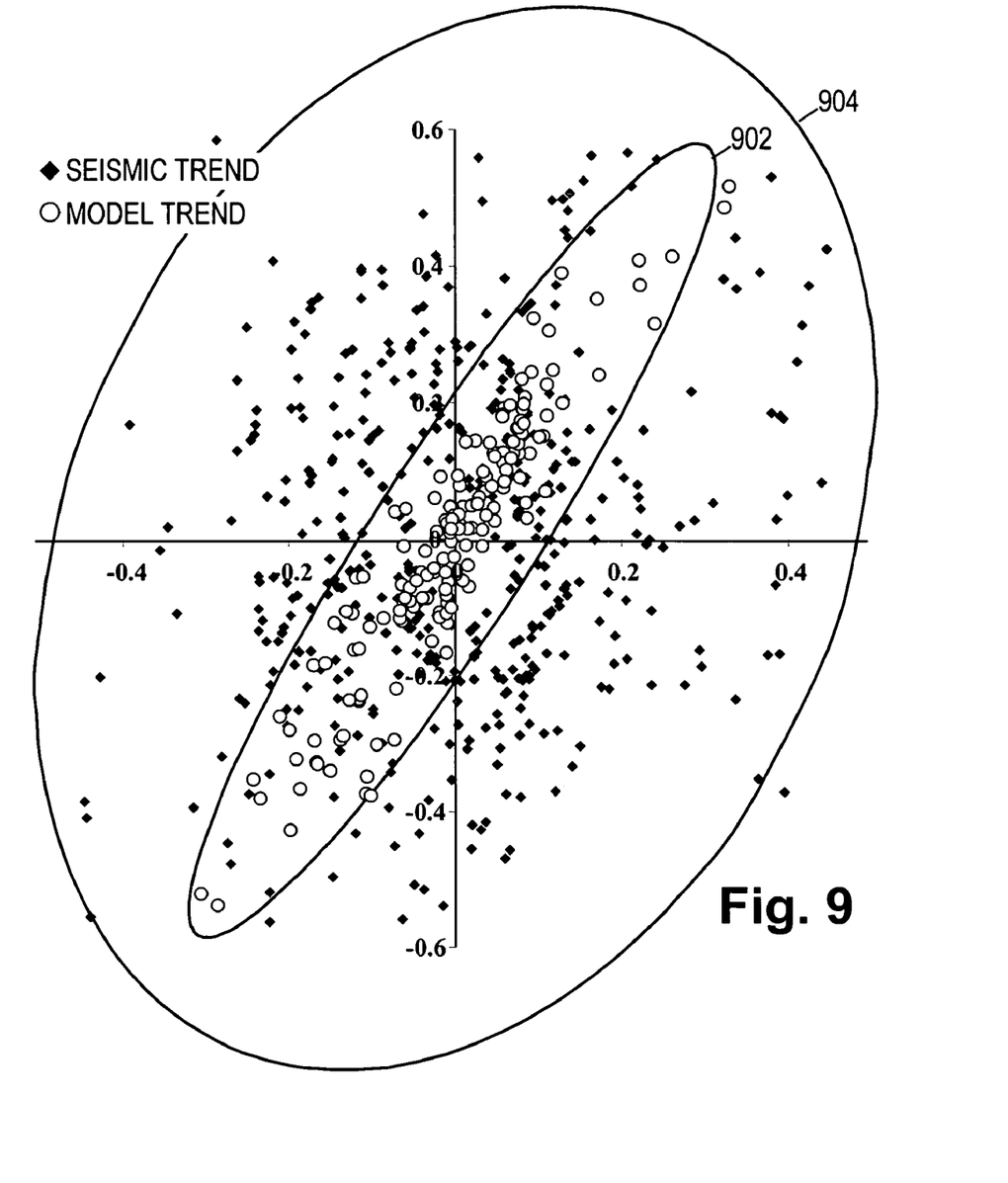
FIG. 9 shows an illustrative crossplot comparing seismic survey calculations to synthetic survey calculations.

In block 410, system 210 forms a crossplot, i.e., system 210 combines seismic attributes in the region as an (x,y) pair. In the present example, zero-offset pressure wave reflectivity Rp is combined with zero-offset shear wave reflectivity Rs. In FIG. 9, a diamond symbol is plotted at coordinates corresponding to (Rp,Rs), the reflectivity pairs for the selected region.

When AVO attributes such as Rp and Rs are displayed in a crossplot, the cluster of points from wet sand/shale reflections form a linear trend. This is often called the background trend. Smith and Gidlow, in "Weighted Stacking for Rock Property Estimation and Detection of Gas" (Geophys. Prosp., v. 35, pp. 993–1014, 1987), showed that at least in the case of Rp and Rs, this background trend is directly related to the relationship between compressional velocity (Vp) and shear velocity (Vs). The cluster of points that make up the background trend has a principal axis that is the long axis through the cloud. Outliers from the background trend are from reflectors that don't share this Vp, Vs relationship. Hydrocarbon saturation is one factor that alters the Vp, Vs relationship.

System 210 operates on AVO attributes derived from seismic data. In this example, P-wave Reflectivity (Rp) and S-wave Reflectivity (Rs) are used to calibrate the data. Other attribute pairs such as Intercept and Gradient, Normal Incidence and Poisson's Reflectivity, or Lambda and Mu Reflectivity could be used as well.

In block 412, system 210 parameterizes the collection of crossplotted points. In one embodiment, the parameterization process involves: 1) taking the mean of the collection to determine the center (xC,yC); 2) determining a least-squares fit of a straight line (through the center) to the collection of points; 3) taking this straight line as the major (primary) axis of the collection, and measuring σ1, the standard deviation of the collection along the major axis; 4) taking a line perpendicular to the major axis and through the center as the minor (secondary) axis of the collection, and measuring the σ2, standard deviation of the collection along the minor axis. These four parameters (center, major axis, standard deviation along the major axis, and standard deviation along the minor axis) can be summarized and displayed as an ellipse. FIG. 9 shows an ellipse 904 having the least-squares fit line as the major axis, having the dimension along the major axis equal to two times the standard deviation along this axis, and having the dimension along the minor axis equal to two times the standard deviation along that axis.

In block 414 (FIG. 4), system 210 obtains an acoustic model of the formation. In block 416, system 210 generates synthetic AVO gathers from the acoustic model. Methods for generating synthetic AVO gathers are well known and may be found in standard texts. See, e.g., K. Aki and P. G. Richards, *Quantitative Seismology: Theory and Methods*, W.H. Freeman and Co., 1980. In one embodiment, a full-offset synthetic is constructed from the log data using a ray-tracing algorithm to calculate incidence angles and Aki and Richards equations (Id. at p. 150) to calculate reflection amplitude. Offsets are chosen to mimic the actual seismic data. The reflection series is convolved with a zero-phase wavelet extracted from the seismic data at the well location.

In block 418, the operations of block 406 are applied to the synthetic AVO gathers to determine the reflectivity coefficients (or other seismic attributes). In block 408, system 210 isolates a region of the reflection coefficient (or other seismic attribute) data to serve as a reference for the calibration. The selection of this region was discussed above.

In block 422, system 210 combines seismic reference attributes from the selected region to form a crossplot. In block 424, system 210 parameterizes the collection of reference crossplot points. FIG. 9 shows a circle symbol at coordinates corresponding to (Rp,Rs), the reference reflectivity pairs from the selected region. FIG. 9 further shows ellipse 902, which represents the parameters for the collection of reference points.

FIG. 9 illustrates the significant difference between the reflectivities determined from the seismic survey, and the reflectivities determined from the synthetic, or model, survey. Although the model formation's lack of detail may account for some of the differences, the bulk of the differences are due to scaling errors in the seismic survey. Accordingly, system 210 modifies the seismic survey crossplot distribution to match the synthetic survey crossplot distribution.

Figure 10:
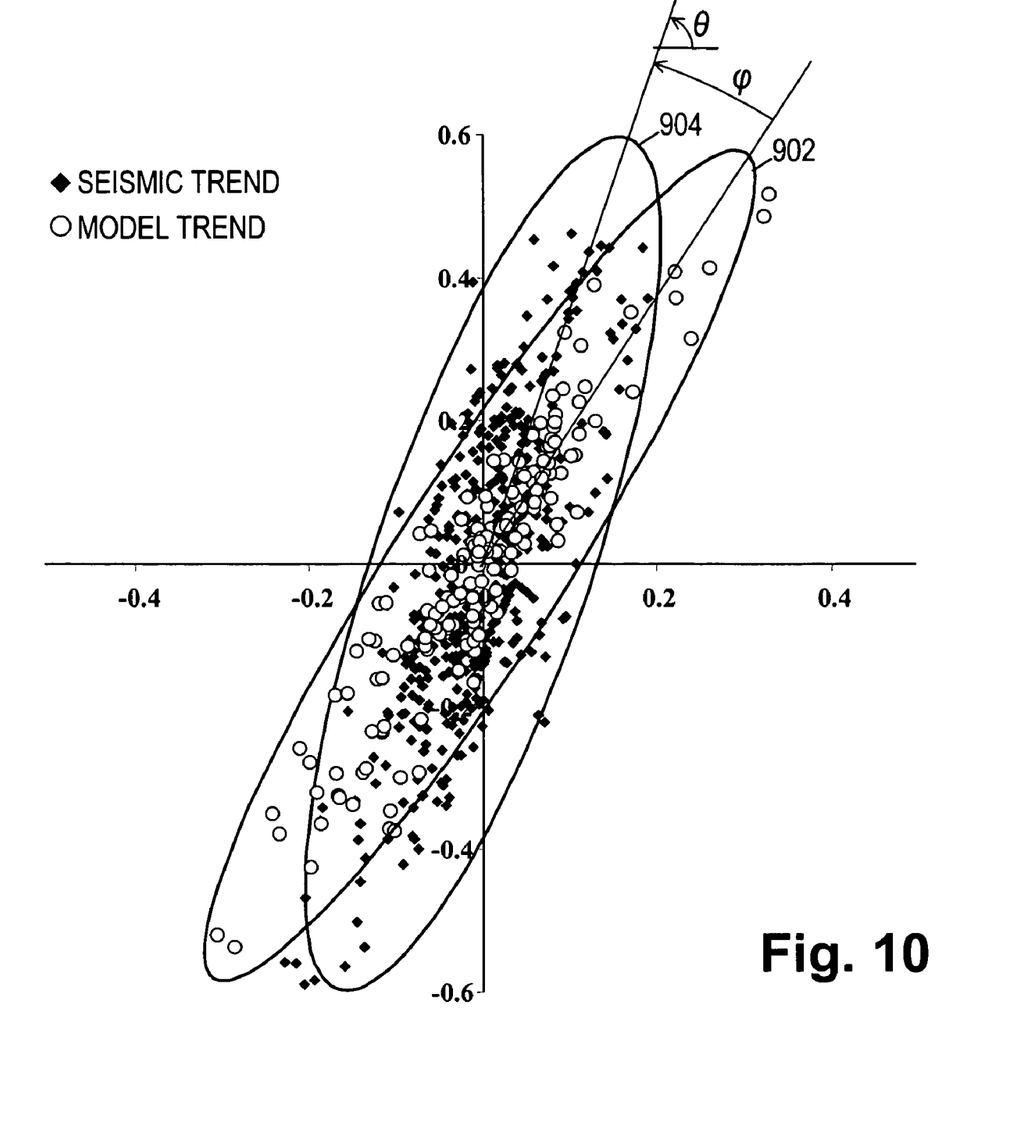
FIG. 10 shows an illustrative crossplot comparing scaled seismic survey calculations to synthetic survey calculations.

In block 426 (FIG. 4), system 210 scales and rotates the crossplot from the seismic survey to match that from the synthetic survey. In one embodiment, the scale factor along the major axis is $\sigma_{1M}/\sigma_{1S}$, the ratio of the model data's standard deviation along the major axis to the seismic data's standard deviation along the major axis. Similarly, the scale factor along the minor axis is $\sigma_{2M}/\sigma_{2S}$, the ratio of the standard deviations along the minor axis. The scaling may be viewed conceptually as rotating the major and minor axes to align with the coordinate axes, scaling the coordinate axes, and rotating the major and minor axes back into position. Thus the coordinates of the scaled crossplot are:

$$\begin{bmatrix} x_{scaled} \\ y_{scaled} \end{bmatrix} = \begin{bmatrix} \cos\theta & -\sin\theta \\ \sin\theta & \cos\theta \end{bmatrix} \begin{bmatrix} \sigma_{1M}/\sigma_{1S} & 0 \\ 0 & \sigma_{2M}/\sigma_{2S} \end{bmatrix}$$
$$\begin{bmatrix} \cos\theta & \sin\theta \\ -\sin\theta & \cos\theta \end{bmatrix} \begin{bmatrix} x \\ y \end{bmatrix},$$

where (x,y) are the original crossplot coordinates for the seismic survey data, and θ is the angle between the major axis and the x-axis. FIG. 10 compares the scaled seismic survey crossplot with the model crossplot.

The scaled crossplot is then rotated to align with the model crossplot. System 210 determines φ, the angle measured counterclockwise from the major axis of the model crossplot to the major axis of the survey crossplot. System 210 then determines the coordinates of the rotated crossplot as:

$$\begin{bmatrix} x_{calibrated} \\ y_{calibrated} \end{bmatrix} = \begin{bmatrix} \cos\varphi & \sin\varphi \\ -\sin\varphi & \cos\varphi \end{bmatrix} \begin{bmatrix} x_{scaled} \\ y_{scaled} \end{bmatrix}.$$

Figure 11:
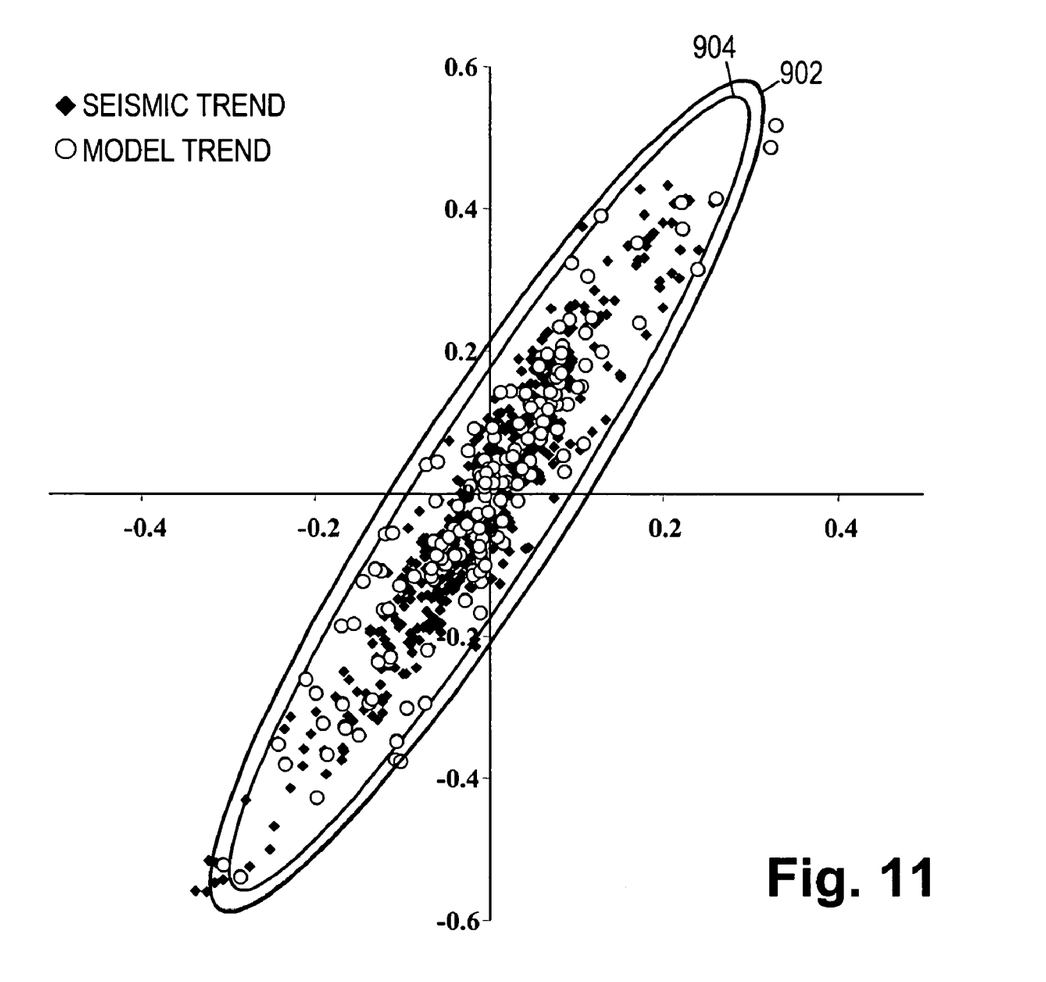
FIG. 11 shows an illustrative crossplot comparing scaled and rotated seismic survey calculations to synthetic survey calculations.

FIG. 11 compares the scaled and rotated crossplot with the model crossplot. Note that the ellipses 902, 904 are offset from each other for illustrative purposes, but mathematically they would coincide. The scale factors $\sigma_{1M}/\sigma_{1S}$ and $\sigma_{2M}/\sigma_{2S}$, and the rotation angle $\phi$, are stored for later use.

In block 428 (FIG. 4), system 210 processes the seismic survey AVO gathers to separate the AVO trend from the AVO "noise". That is, the AVO gathers provide at each position and time an indication of reflected wave intensity R as a function of offset angle $\alpha$:

$$R(\alpha)=R_T(\alpha)+R_N(\alpha),$$

where $R_T$ is the trend as determined by a least-squares second-order polynomial fit, and $R_N$ is the difference between R and $R_T$.

In block 430, system 210 employs the scale factors and the rotation angle determined from the calibration process to determine a new AVO trend and AVO noise. The new (calibrated) trend is:

$$R_{CT}(\alpha) = \frac{Rp}{2}\left(\frac{\sigma_{1M}}{\sigma_{1S}}\right)\sec^2(\alpha)\cos(\varphi) - Rp\left(\frac{\sigma_{2M}}{\sigma_{2S}}\right)\sin^2(\alpha)\sin(\varphi) - \frac{Rs}{2}\left(\frac{\sigma_{2M}}{\sigma_{2S}}\right)\sec^2(\alpha)\sin(\varphi) - Rs\left(\frac{\sigma_{1M}}{\sigma_{1S}}\right)\sin^2(\alpha)\cos(\varphi),$$

where Rp is the (unscaled) zero-incidence pressure wave reflectivity (see FIG. 7) and Rs is the (unscaled) zero-incidence shear wave reflectivity (see FIG. 8). The new (calibrated) noise is:

$$R_{CN}(\alpha) = \left(\frac{\sigma_{1M}}{\sigma_{1S}}\right)R_N(\alpha).$$

In block 432 (FIG. 4), system 210 combines the calibrated trend and calibrated noise to obtain calibrated AVO gathers. The calibrated gathers are:

$$R_C(\alpha)=R_{CT}(\alpha)+R_{CN}(\alpha).$$

Figure 12:
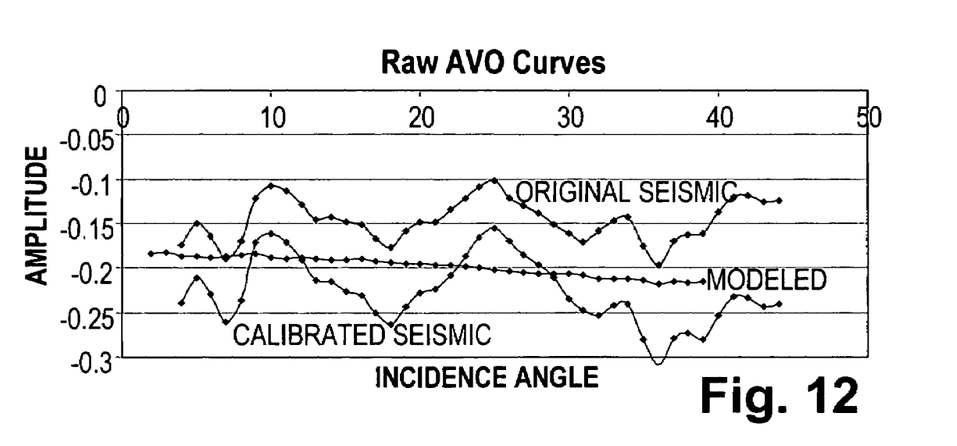
FIG. 12 shows an illustrative graph comparing incidence angle dependence of seismic survey data (both calibrated and uncalibrated) to that of synthetic survey data.
Figure 13:
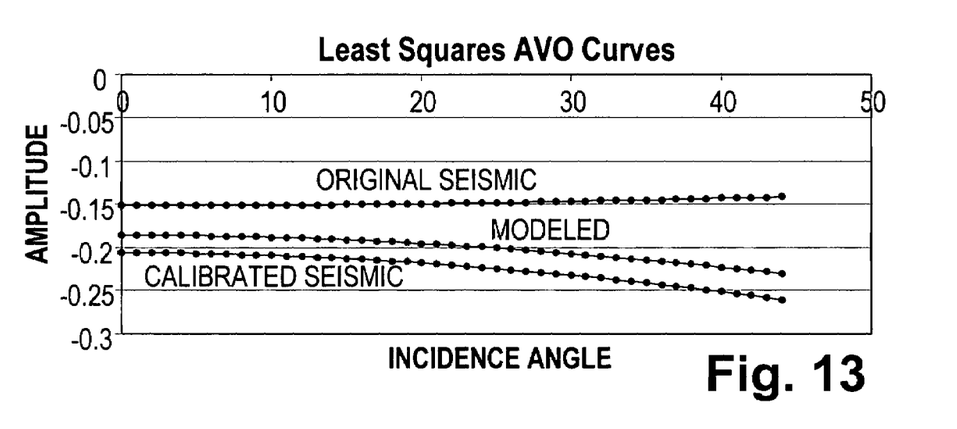
FIG. 13 shows an illustrative graph comparing trends of incidence angle dependence for seismic survey data and synthetic survey data.

FIG. 12 shows the dependence of reflected wave intensity R on offset angle $\alpha$ for a raw AVO gather (FIG. 6), a synthetic AVO gather, and for the calibrated AVO gather. FIG. 13 compares the AVO trends for each of these curves.

The calibrated AVO gathers generated by the method of FIG. 4 can then be used for calculations of stacks or other seismic attributes. When the calibrated AVO gathers are used to calculate fluid factors (e.g., the ratio of Rp to Rs), the results have proven to be cleaner and more interpretable. In this manner, system 210 highlights proven hydrocarbon concentrations with greater accuracy, and is expected to significantly enhance success probabilities for future exploration ventures.

In the foregoing description, the scale factors were expressed as ratios of standard deviations. In alternative embodiments, the scale factors (and rotation angles) may be determine visually, e.g., by interactive rotation and scaling by a computer user who visually determines when the survey attribute pairs are calibrated to the independent attribute pairs. The visual alignment may be aided by the use of geometric shapes such as ellipses or rectangles having orientations and dimensions determined by the distribution of attribute pairs. In another embodiment, the scale factors (and rotation angle) may be determined by correlation coefficient matching.

Numerous variations and modifications will become apparent to those skilled in the art once the above disclosure is fully appreciated. It is intended that the following claims be interpreted to embrace all such variations and modifications.

What is claimed is:

1. A method of calibrating seismic data, the method comprising:
   receiving traces from a seismic survey that covers a volume;
   determining a pair of seismic attributes for each of a plurality of positions within the volume ("survey pairs");
   deriving a pair of seismic attributes for each of said plurality of positions from a source independent of the survey ("independent pairs");
   calculating a rotation angle and one or more scale factors that calibrate the survey pairs relative to the independent pairs; and
   calibrating the traces with the rotation angle and the one or more scale factors.

2. The method of claim 1, wherein said determining comprises:
   combining traces to form at least one amplitude versus offset (AVO) gather; and
   determining the survey pairs from the at least one AVO gather.

3. The method of claim 2, wherein the survey pairs include pressure wave reflectivity (Rp) and shear wave reflectivity (Rs).

4. The method of claim 2, wherein the survey pairs are a pair type from a set consisting of: Intercept and Gradient, Normal Incidence and Poisson's Reflectivity, and Lambda and Mu Reflectivity.

5. The method of claim 1, wherein said deriving comprises:
   creating a formation model from borehole logging data;
   obtaining synthetic survey traces from the formation model;
   forming at least one synthetic AVO gather from the synthetic traces; and
   determining the independent pairs from the at least one synthetic AVO gather.

6. The method of claim 1, wherein said calculating includes:
   finding a primary axis for the survey pairs;
   measuring a primary standard deviation of the survey pairs along the primary axis, and a secondary standard deviation of the survey pairs perpendicular to the primary axis;
   finding an independent primary axis for the independent pairs; and
   measuring a primary standard deviation of the independent pairs along the independent primary axis, and a secondary standard deviation of the independent pair perpendicular to the independent primary axis.

7. The method of claim 6, wherein said calculating further includes:
   calculating the rotation angle from a difference between angles of the primary axis and the independent primary axis;

calculating a primary scale factor from a ratio between primary standard deviations of the survey pairs and the independent pairs; and calculating a secondary scale factor from a ratio between secondary standard deviations of the survey pairs and the independent pairs.

8. The method of claim 6, wherein said calculating further includes:

displaying a survey geometric shape having an orientation and dimensions representative of the primary axis, and the primary and secondary standard deviations of the survey pairs;

displaying an independent geometric shape having an orientation and dimensions representative of the independent primary axis, and the primary and secondary standard deviations of the independent pairs; and rotating and scaling one of the geometric shapes to match the other, thereby determining the rotation angle and one or more scale factors.

9. The method of claim 8, wherein at least one of the geometric shapes is a rectangle.

10. The method of claim 8, wherein at least one of the geometric shapes is an ellipse.

11. The method of claim 1, wherein said calibrating includes:

separating at least one AVO gather into a corresponding AVO trend and AVO noise;

scaling the AVO trend as a function of scale factor, offset angle, and rotation angle;

scaling the AVO noise independent of offset angle and rotation angle; and combining the scaled AVO trend with the scaled AVO noise to form a corresponding calibrated AVO gather.

12. The method of claim 11, wherein said separating includes:

determining the AVO noise to be a difference between an AVO gather and a least-squares second order polynomial fit to the AVO gather.

13. The method of claim 11, wherein said scaling of the AVO trend is representable as:

$$R_{CT}(\alpha) = \frac{Rp}{2}\left(\frac{\sigma_{1M}}{\sigma_{1S}}\right)\sec^2(\alpha)\cos(\varphi) - Rp\left(\frac{\sigma_{2M}}{\sigma_{2S}}\right)\sin^2(\alpha)\sin(\varphi) - \frac{Rs}{2}\left(\frac{\sigma_{2M}}{\sigma_{2S}}\right)\sec^2(\alpha)\sin(\varphi) - Rs\left(\frac{\sigma_{1M}}{\sigma_{1S}}\right)\sin^2(\alpha)\cos(\varphi),$$

where Rp is the zero-incidence pressure wave reflectivity, Rs is the zero-incidence shear wave reflectivity, $\sigma_{1M}/\sigma_{1S}$ is a ratio of primary standard deviations for the independent and survey pairs, $\sigma_{2M}/\sigma_{2S}$ is a ratio of secondary standard deviations for the independent and survey pairs, $\alpha$ is the offset angle, and $\varphi$ is the rotation angle.

14. The method of claim 13, wherein said scaling of the AVO noise $R_N$ is representable as:

$$R_{CN}(\alpha) = \left(\frac{\sigma_{1M}}{\sigma_{1S}}\right)R_N(\alpha).$$

15. The method of claim 14, wherein said combining is representable as:

$$R_C(\alpha) = R_{CT}(\alpha) + R_{CN}(\alpha).$$

16. A method of calibrating seismic data, the method comprising:

receiving a set of seismic traces;

processing the set of seismic traces to form at least one amplitude versus offset (AVO) gather;

determining a pair of seismic attributes for each of multiple positions within the at least one AVO gather;

calculating parameters that calibrate the pairs of seismic attributes relative to pairs of seismic attributes determined from a source independent of the set of seismic traces; and adjusting the set of seismic traces in accordance with the parameters, wherein the parameters include a rotation angle between the trace pair primary axis (a primary axis for seismic attribute pairs determined from seismic traces) and the independent pair primary axis (a primary axis for seismic attribute pairs determined from the independent source).

17. The method of claim 16, wherein the parameters further include a ratio between standard deviations along the trace pair primary axis and along the independent pair primary axis.

18. The method of claim 17, wherein the parameters further include a ratio between standard deviations perpendicular to the trace pair primary axis and perpendicular to the independent pair primary axis.

19. The method of claim 16, wherein said adjusting includes:

separating at least one AVO gather into a corresponding AVO trend and AVO noise;

scaling the AVO trend as a function of scale factor, offset angle, and rotation angle;

scaling the AVO noise independent of offset angle and rotation angle; and combining the scaled AVO trend with the scaled AVO noise to form a corresponding calibrated AVO gather.

20. The method of claim 19, wherein said separating includes:

determining the AVO noise to be a difference between an AVO gather and a least-squares second order polynomial fit to the AVO gather.

21. The method of claim 19, wherein said scaling of the AVO trend is representable as:

$$R_{CT}(\alpha) = \frac{Rp}{2}\left(\frac{\sigma_{1M}}{\sigma_{1S}}\right)\sec^2(\alpha)\cos(\varphi) - Rp\left(\frac{\sigma_{2M}}{\sigma_{2S}}\right)\sin^2(\alpha)\sin(\varphi) - \frac{Rs}{2}\left(\frac{\sigma_{2M}}{\sigma_{2S}}\right)\sec^2(\alpha)\sin(\varphi) - Rs\left(\frac{\sigma_{1M}}{\sigma_{1S}}\right)\sin^2(\alpha)\cos(\varphi),$$

where Rp is a zero-incidence pressure wave reflectivity, Rs is a zero-incidence shear wave reflectivity, $\sigma_{1M}/\sigma_{1S}$ is a ratio of primary standard deviations for the independent and survey pairs, $\sigma_{2M}/\sigma_{2S}$ is a ratio of secondary standard deviations for the independent and survey pairs, $\alpha$ is the offset angle, and $\varphi$ is the rotation angle.

22. The method of claim 21, wherein said scaling of the AVO noise $R_N$ is representable as:

$$R_{CN}(\alpha) = \left(\frac{\sigma_{1M}}{\sigma_{1S}}\right)R_N(\alpha).$$

23. The method of claim 22, wherein said combining is representable as:

$$R_C(\alpha) = R_{CT}(\alpha) + R_{CN}(\alpha).$$

24. The method of claim 16, wherein the pair of seismic attributes is pressure wave reflectivity (Rp) and shear wave reflectivity (Rs).

25. The method of claim 16, wherein the pair of seismic attributes is from a set consisting of: Intercept and Gradient, Normal Incidence and Poisson's Reflectivity, and Lambda and Mu Reflectivity.

26. The method of claim 16, wherein said calculating parameters includes:
selecting a subset of the pairs of seismic attributes, wherein the subset includes positions of the at least one AVO gather where the pairs are expected to satisfy a linear relationship.

27. A system for calibrating seismic data, the system comprising:
a memory configured to store software; and
a processor coupled to the memory to retrieve and execute software, wherein the software configures the processor to:
receive traces from a seismic survey that covers a volume;
process the traces to determine a pair of seismic attributes for each of a plurality of positions within the volume ("survey pairs");
obtain a pair of seismic attributes for each of said plurality of positions from a source independent of the survey ("independent pairs");
ascertain a rotation angle and one or more scale factors that calibrate the survey pairs relative to the independent pairs; and
calibrate the traces with the rotation angle and the one or more scale factors.

28. The system of claim 27, wherein as part of processing the traces to determine pairs of seismic attributes, the software configures the processor to:
combine traces to form at least one amplitude versus offset (AVO) gather; and
determine the survey pairs from the at least one AVO gather.

29. The system of claim 28, wherein the survey pairs are of a type from a set consisting of: Intercept and Gradient, Normal Incidence and Poisson's Reflectivity, Lambda and Mu Reflectivity, and pressure wave reflectivity (Rp) and shear wave reflectivity (Rs).

30. The system of claim 27, wherein as part of ascertaining a rotation angle and one or more scale factors, the software configures the processor to:
find a primary axis for the survey pairs;
measure a primary standard deviation of the survey pairs along the primary axis, and a secondary standard deviation of the survey pairs perpendicular to the primary axis;
find an independent primary axis for the independent pairs; and
measure a primary standard deviation of the independent pairs along the independent primary axis, and a secondary standard deviation of the independent pair perpendicular to the independent primary axis.

31. The system of claim 30, wherein as part of ascertaining the rotation angle and one or more scale factors, the software further configures the processor to:
ascertain the rotation angle from a difference between angles of the primary axis and the independent primary axis;
ascertain a primary scale factor from a ratio between primary standard deviations of the survey pairs and the independent pairs; and
ascertain a secondary scale factor from a ratio between secondary standard deviations of the survey pairs and the independent pairs.

32. The system of claim 30, wherein as part of ascertaining the rotation angle and one or more scale factors, the software further configures the processor to:
display a survey geometric shape having an orientation and dimensions representative of the primary axis, and the primary and secondary standard deviations of the survey pairs;
display an independent geometric shape having an orientation and dimensions representative of the independent primary axis, and the primary and secondary standard deviations of the independent pairs; and
rotate and scale one of the geometric shapes to match the other, thereby ascertaining the rotation angle and one or more scale factors.

33. The system of claim 27, wherein as part of calibrating the traces, the software configures the processor to:
separate at least one AVO gather into a corresponding AVO trend and AVO noise;
scale the AVO trend as a function of scale factor, offset angle, and rotation angle;
scale the AVO noise independent of offset angle and rotation angle; and
combine the scaled AVO trend with the scaled AVO noise to form a corresponding calibrated AVO gather.

* * * * *